Aug. 8, 1944.   D. H. CLEWELL ET AL   2,355,421
GRAVITY METER
Filed Aug. 6, 1941   15 Sheets-Sheet 1

Inventors
DAYTON H. CLEWELL
HENRY A. MAEDER
By Dallas R. Lamont
Attorney

Aug. 8, 1944.  D. H. CLEWELL ET AL  2,355,421
GRAVITY METER
Filed Aug. 6, 1941  15 Sheets-Sheet 2

Inventors
Dayton H. Clewell
Henry A. Maeder
By Dallas R. Lamont
Attorney

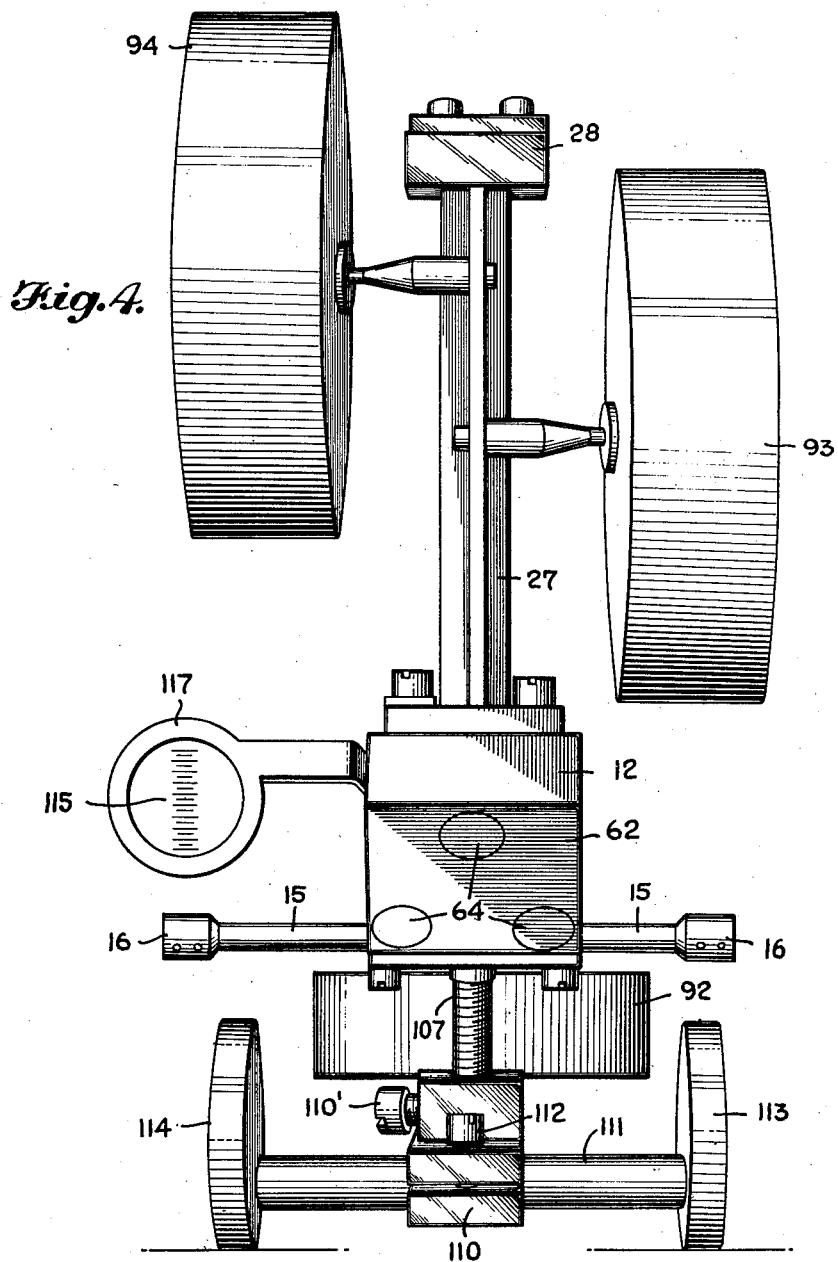

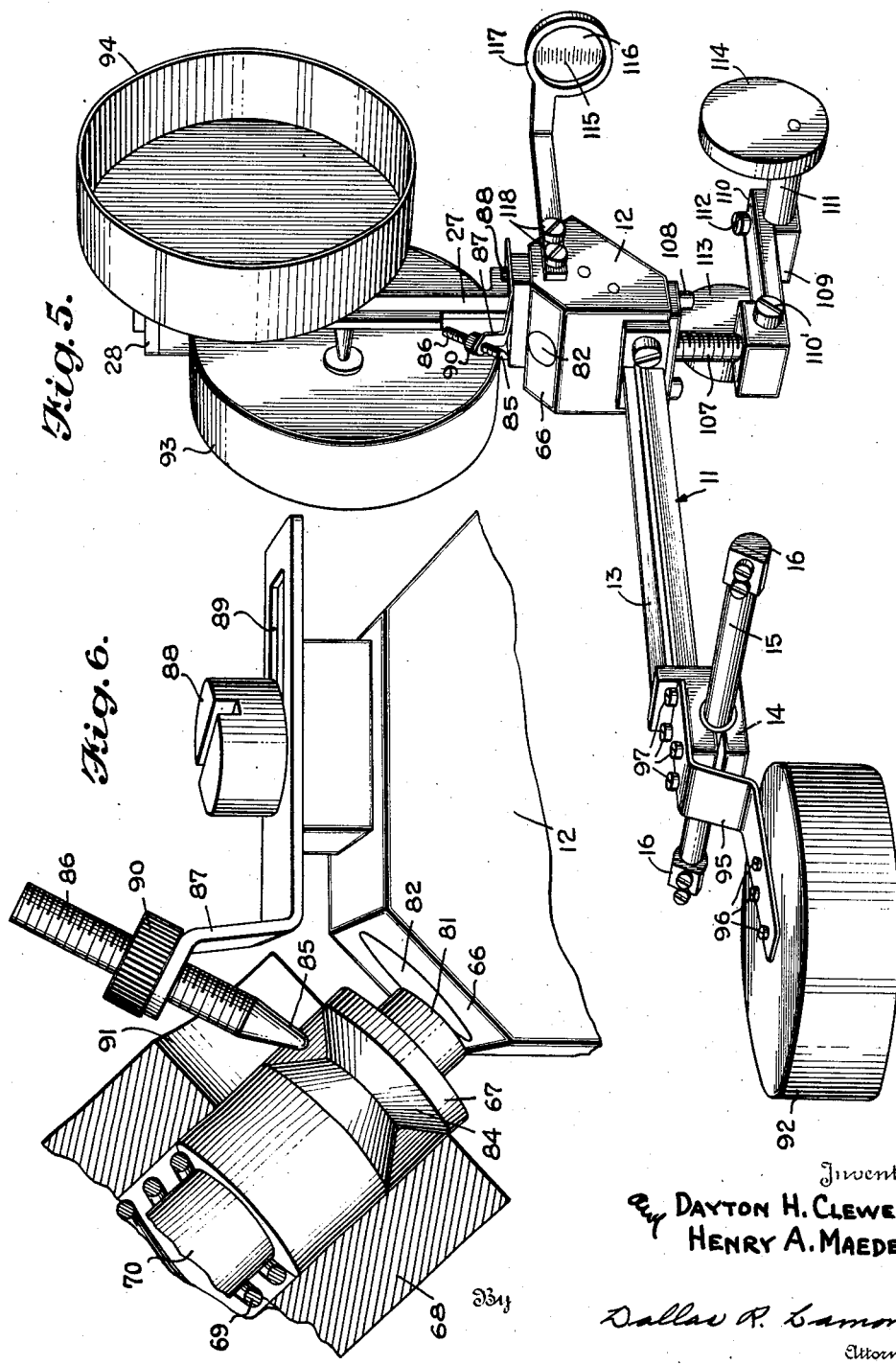

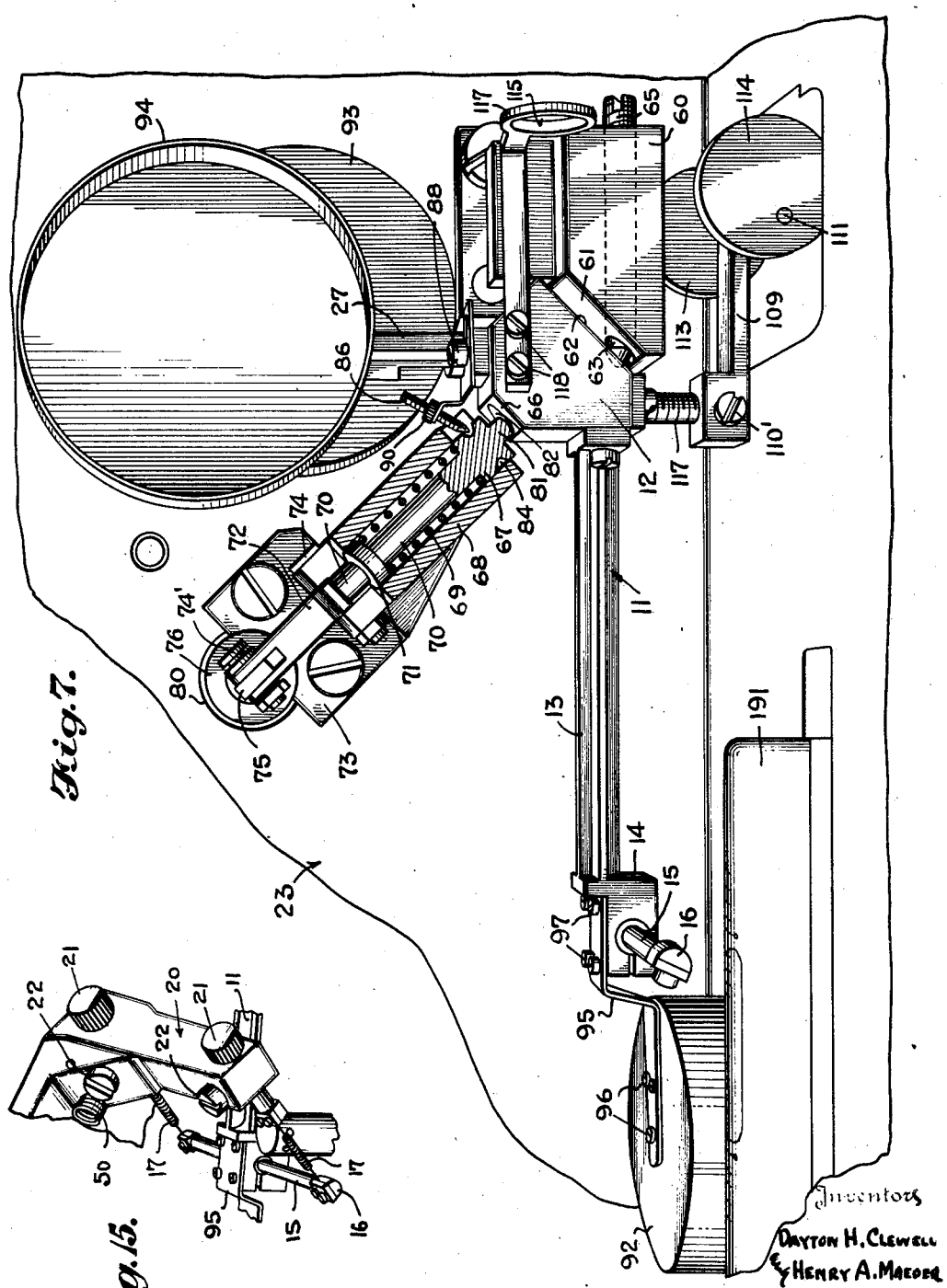

Aug. 8, 1944.　　　D. H. CLEWELL ET AL　　　2,355,421
GRAVITY METER
Filed Aug. 6, 1941　　　15 Sheets-Sheet 6
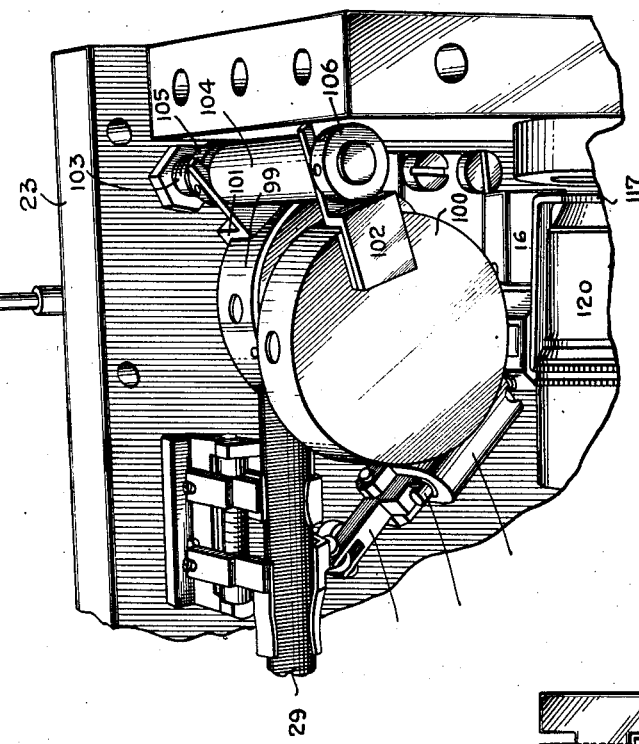
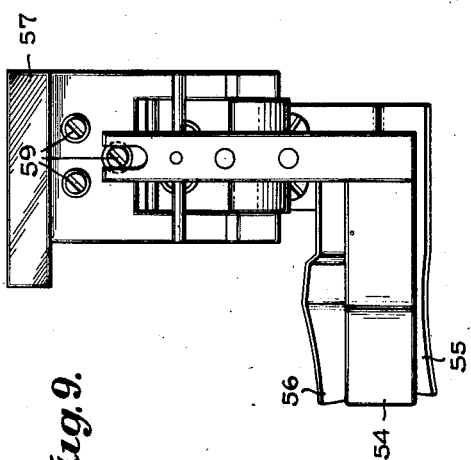
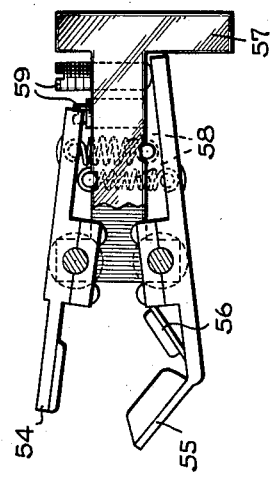
Inventors
Dayton H. Clewell
Henry A. Maeder
By Dallas R. Lamont
Attorney

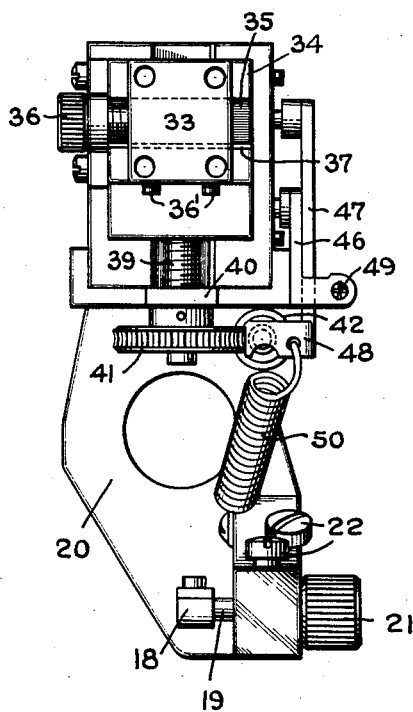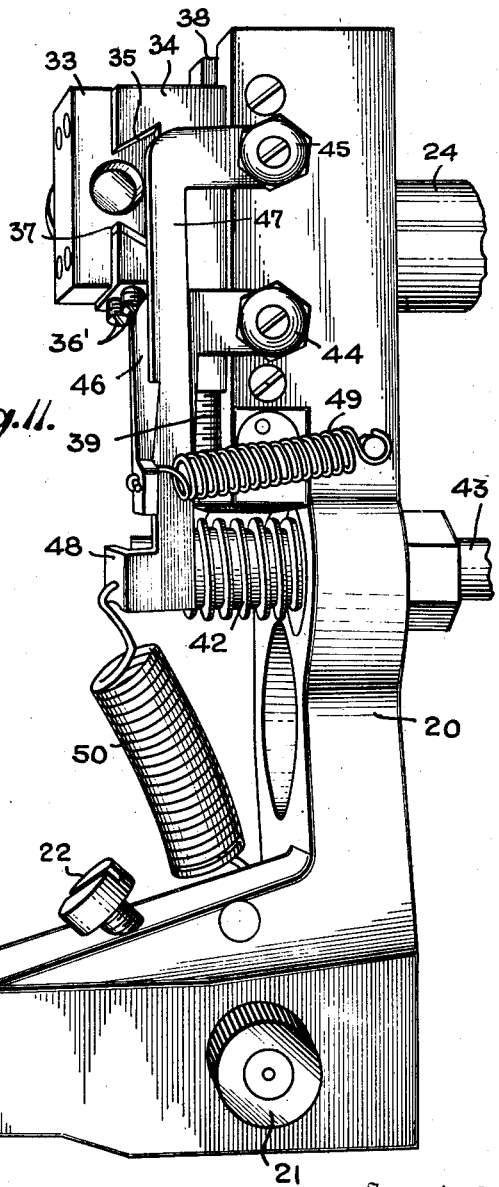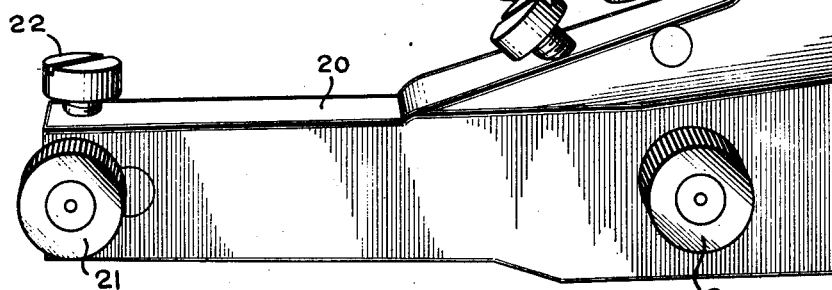

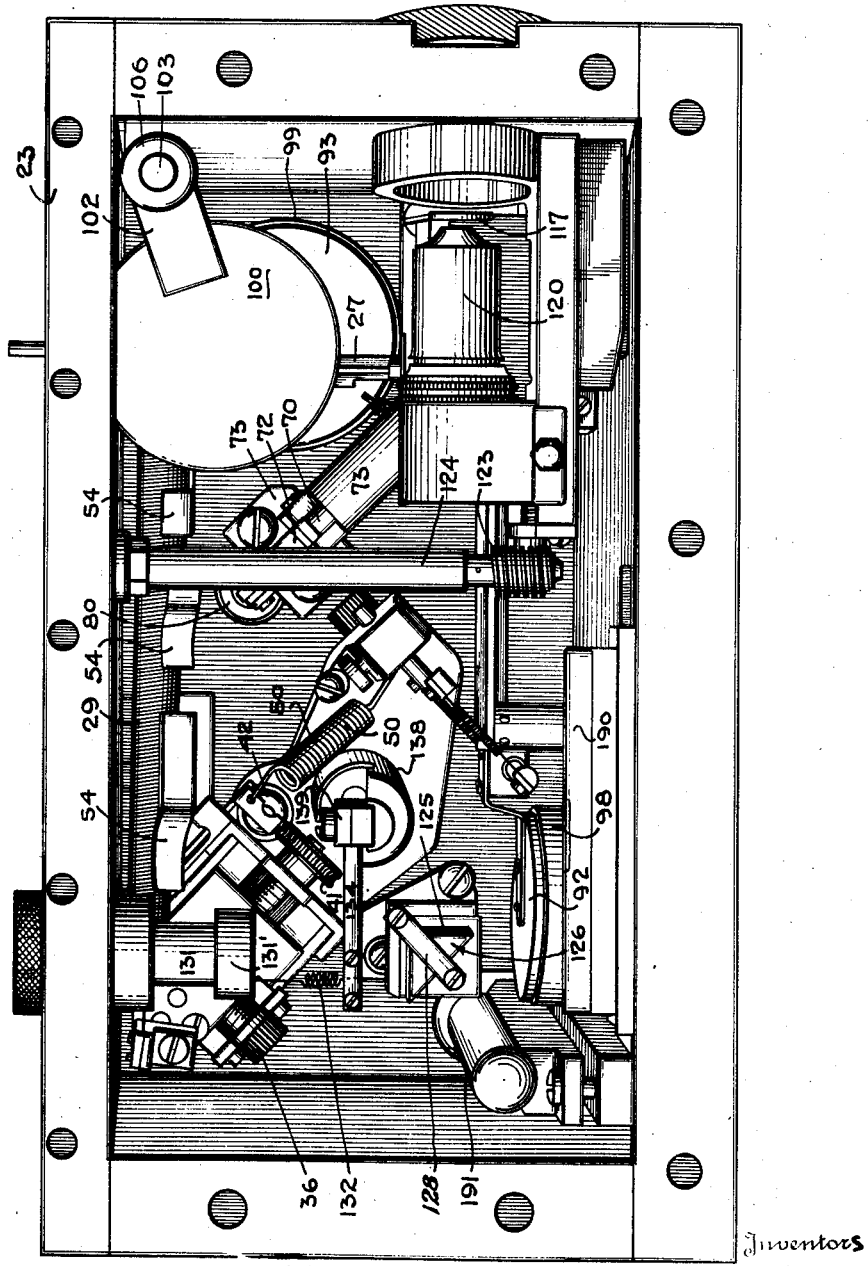

Aug. 8, 1944.　　　D. H. CLEWELL ET AL　　　2,355,421
GRAVITY METER
Filed Aug. 6, 1941　　　15 Sheets-Sheet 9

Inventors
Dayton H. Clewell
Henry A. Maeder
By Dallas R. Lamont
Attorney

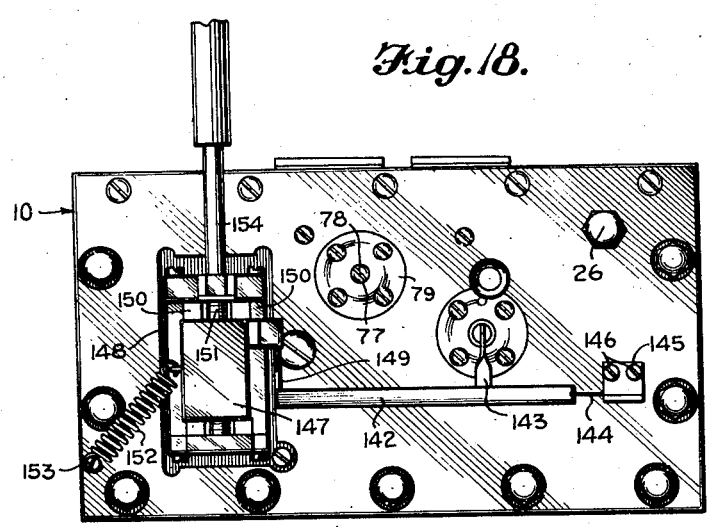
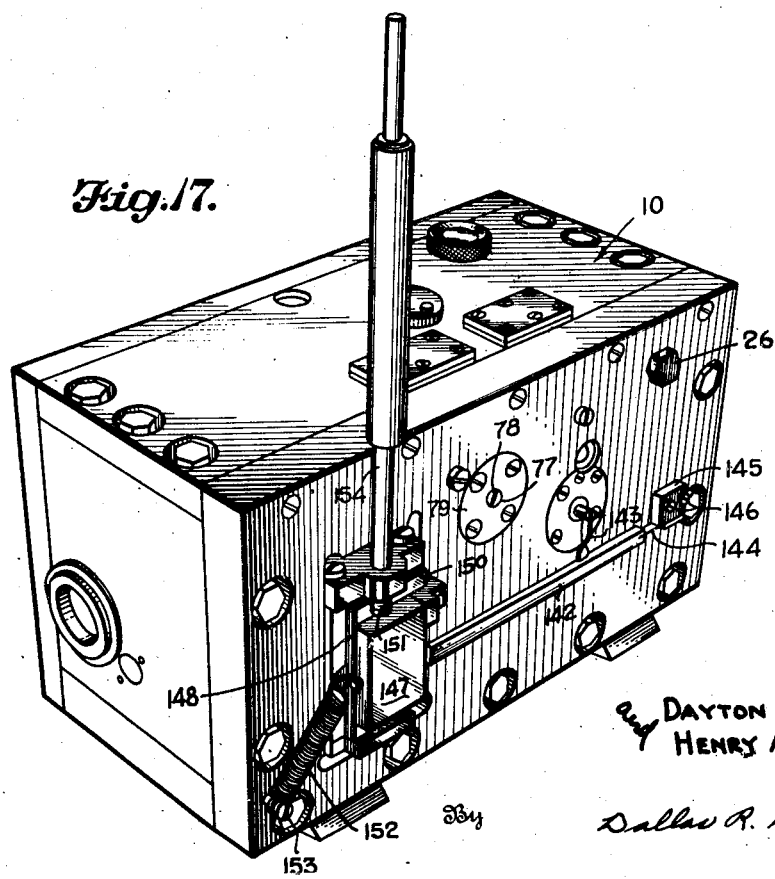

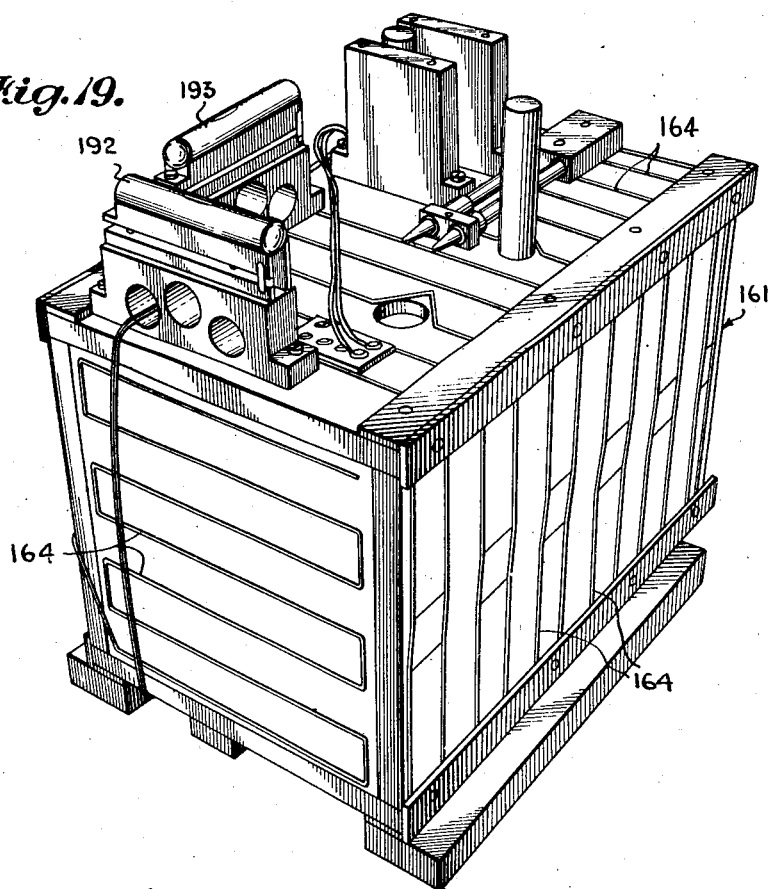
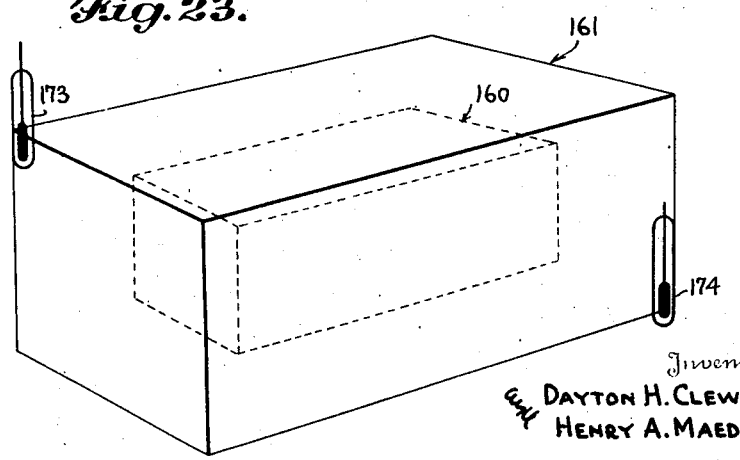

Aug. 8, 1944.  D. H. CLEWELL ET AL  2,355,421
GRAVITY METER
Filed Aug. 6, 1941  15 Sheets-Sheet 12

Inventors
Dayton H. Clewell
Henry A. Maeder
By Dallas R. Lamont
Attorney

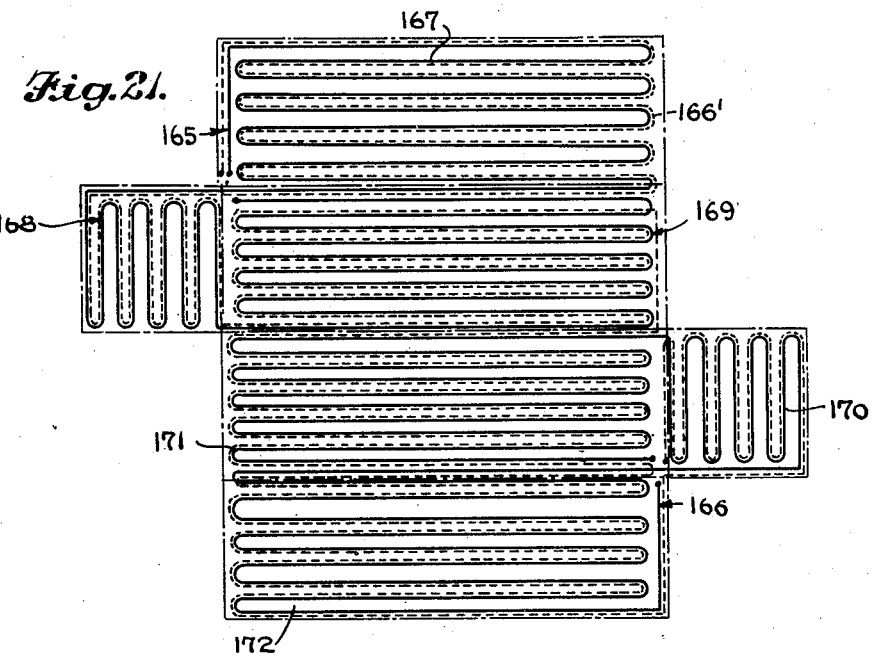
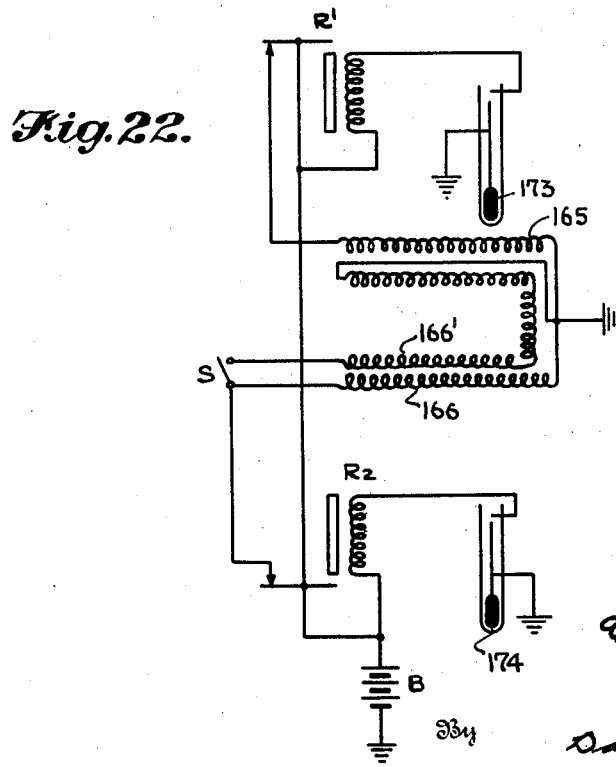

Aug. 8, 1944.  D. H. CLEWELL ET AL  2,355,421
GRAVITY METER
Filed Aug. 6, 1941  15 Sheets-Sheet 15
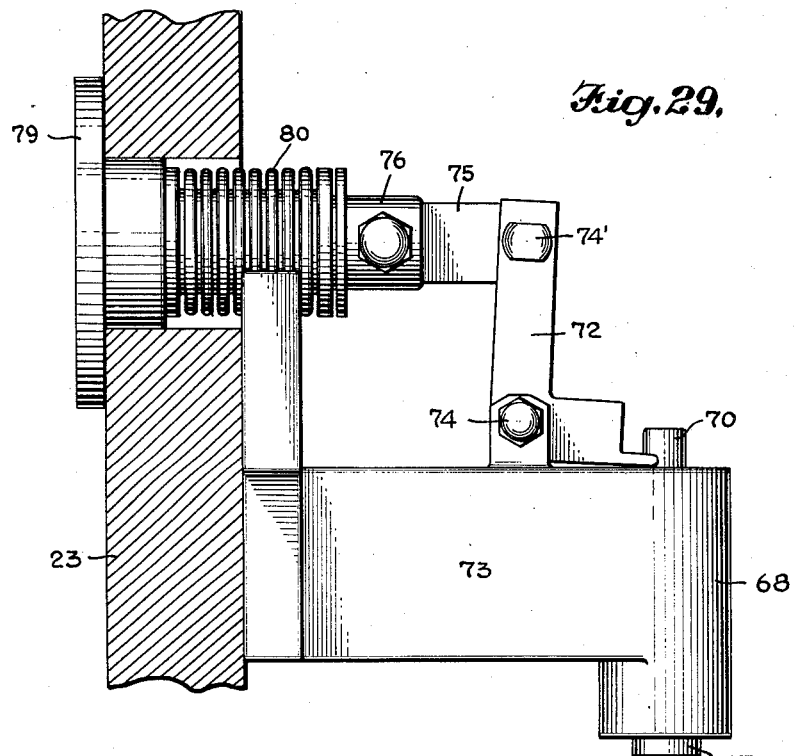
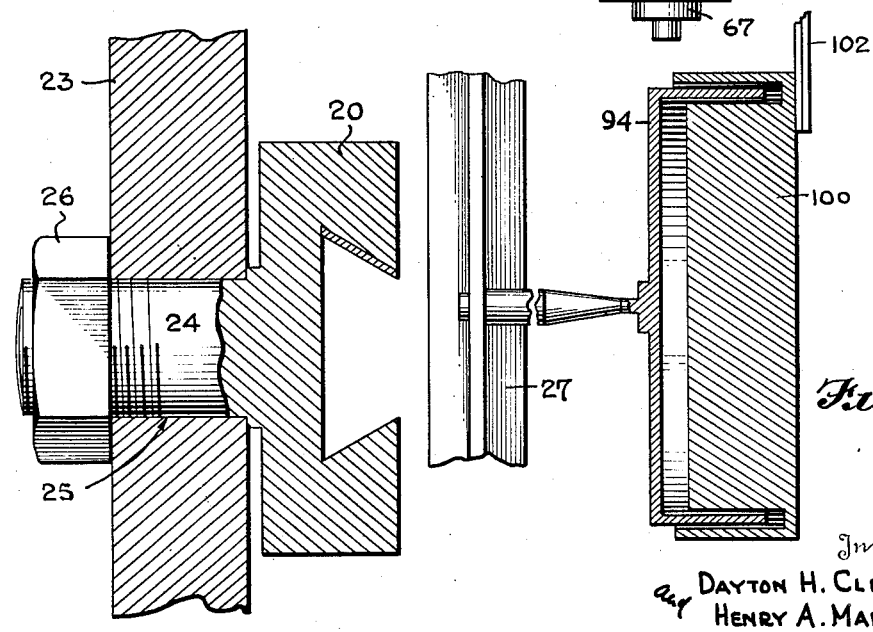
Inventors
Dayton H. Clewell
Henry A. Maeder
By Dallas R. Lamont
Attorney Patented Aug. 8, 1944

2,355,421

UNITED STATES PATENT OFFICE 2,355,421

GRAVITY METER

Dayton H. Clewell and Henry A. Maeder, Dallas, Tex., assignors to Socony-Vacuum Oil Company, Incorporated, New York, N. Y., a corporation of New York Application August 6, 1941, Serial No. 405,634

17 Claims. (Cl. 265—1.4)

This invention relates to instruments for measuring the force of gravity and more particularly to an instrument of this type that is sensitive enough and rugged enough to be used in the field work of geophysical exploration. In this work comparisons of gravity measurements made at many points on an area of the earth's surface are compared and the information so obtained utilized as an indication of abnormalities in subsurface structure.

Gravity meters have long been used and many types have been devised for the particular purpose of geophysical exploration, but none has been entirely satisfactory. Among the common faults with present day gravity meters, are lack of sensitivity, sensitivity to forces other than the earth's gravitation, excessive weight, lack of ruggedness, difficulty of adjustment, long periods necessary for operation and lack of proper temperature and barometric compensation.

In an effort to overcome as many of these undesirable features as possible, the gravity meter about to be described was devised. This gravity meter is extremely sensitive, and yet it is quite light in weight, very rugged so that it can be used in the field without danger of damaging it, quite easy to operate and quick to set up for operation, quite insensitive to levels so that the levelling operation may be performed quickly and easily, may be read without delay, is arranged so that variations of temperature and barometric pressure have substantially no effect on it and possesses other marked advantages over the gravity meters in the prior art.

The new gravity meter is of the type generally known as the horizontal, pivoted beam type. This means that a mass is carried at one end of a substantially horizontal beam pivoted at the other end through a fixed support. The beam is prevented from rotating to any great extent about the pivot by a spring or other resilient support for the mass. This type of gravity meter, which is known, has been found to be particularly advantageous because the force of gravity acts in the direction of travel of the mass and the mass is prevented from travelling in any other direction by the pivot. Thus, stray forces acting in directions other than that of gravity are to a great extent prevented from affecting the mass. Furthermore, since the mass is travelling in a substantially vertical direction, small errors in the levelling of the device will affect the force of gravity acting on the mass to only a very small extent, whereas if the mass were travelling in a direction at a greater angle to the force of gravity a small change in angle would have a greater effect upon the action of gravity on the mass.

To still further avoid errors that might be introduced by the mass being at a different position when different measurements are taken or the parts of the meter being differently disposed about the pivot, an arrangement has been incorporated in the new gravity meter whereby all measurements of gravity will be taken with the mass in exactly the same position, that is to say, a null system has been devised whereby the force necessary to bring the gravity meter mass back to a zero position is read as the measurement of gravity.

In addition to this the device includes an arrangement of parts suspended on a single support in such a way that force applied to the outside casing will not warp the parts and thus produce inaccurate readings of the gravity meter. It has been found that even the tightening or loosening of a screw in a very heavy case will cause serious errors if the parts of the gravity meter are supported directly on the case.

Still further the present gravity meter includes means for clamping the moving parts in position and releasing these parts at a later time for operation, without disturbing the calibration or causing a swinging of the gravity meter mass to such an extent that the making of a reading will be materially delayed. Cooperating to this same end, damping means have been provided to damp the movement of the gravity meter mass in all directions so that the mass comes quickly and easily to rest in a position where it can be accurately read.

In addition to these features means are provided for maintaining the working parts of the gravity meter at a constant temperature and for compensating for variations in barometric pressure. Means for making all necessary adjustments simply and expediently are also incorporated in the new device.

Still further, the device has been carefully arranged to prevent any vibration of the resilient supporting means for the mass so that the gravity meter may be moved around and handled in a relatively rough and careless manner without sustaining any injury or affecting its calibration.

Many further advantages and details of this invention will be apparent from the following description of the preferred embodiment thereof. It is to be understood that any or all of the features incorporated in this preferred embodiment may be incorporated in the gravity meter made according to this invention and that it is intended herein to cover not only the combination of all of the features herein disclosed but also to cover separately each of the features herein disclosed, insofar as those features are patentable.

In the drawings:

Figure 4 is an end elevation of the mass assembly;

Figure 5 is a perspective view of the mass assembly;

Figure 6 is an enlarged detail fragmentary view partly in section, showing the mass clamp;

Figure 7 is a side elevation of the mass showing the clamping means partially in vertical section;

Figure 8 is an enlarged fragmentary perspective view showing the spring guards and the manner in which the damping means is adjustably secured to the gravity meter housing;

Figure 9 is a plan view of one group of the spring guards;

Figure 10 is a side elevation of the group of the spring guards shown in Figure 9;

Figure 11 is a perspective view of the casting which serves as a support for all of the operating elements in the gravity meter and adjusting means for the pretensioned coil spring anchor;

Figure 12 is a side elevation of the support shown in Figure 11;

Figure 14 is a side elevation of the gravity meter taken with a side of the casing removed showing all of the working elements in their operative positions within the gravity meter housing;

Figure 15 is a fragmentary perspective view of the pivot;

Figure 17 is a perspective view of the outside of the inner gravity meter casing showing a portion of the nulling system;

Figure 18 is a side elevation of the inner case of the gravity meter, also showing details of the nulling system;

Figure 19 is a perspective view of the oven which encloses the instrument as shown in Figure 17;

Figure 21 is a development of the heater coils;

Figure 22 is a temperature control wiring diagram;

Figure 23 is a perspective view of the oven showing the gravity meter in dotted lines disposed therein and the location of the thermal regulators;

Figure 28 is a detailed sectional view showing the manner in which the support is secured to and spaced from the housing;

Figure 29 is a perspective view of the mass clamping element with the side wall to which it is secured shown in section; and Figure 30 is a cross section of one of the damping elements.

Figure 1:
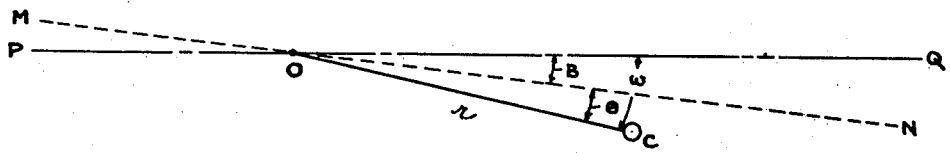
Figure 1 is a diagram developing the theory of the horizontal pivoted beam gravity meter.

The general theory of the horizontal pivoted beam can be briefly outlined as follows: In Figure 1, a truly level surface is represented by the line PQ, while the line MN making an angle $\beta$ with PQ is a reference line fixed to the framework of the instrument relative to which the gravity responsive beam is rotatable. The axis of rotation is horizontal and intersects the horizontal line PQ at 0. The center of gravity of the beam is at C, a distance $r$ from 0. The angle between OC and PQ is $\omega$ and the angle between OC and MN is $\theta$.

The gravity moment of the beam is then $$mgr \cos \omega$$

which is balanced in some way by an elastic torque $\tau$ applied to the beam. The elastic torque is a function of $\theta$ rather than $\omega$ since the elastic means used to generate the torque must obviously be anchored to the framework of the instrument and $\theta$ is the angle denoting the orientation of the beam relative to the framework.

For a general discussion no further specification of the details of the origin and application of the elastic torque is necessary. The instant invention as will be described later will first be concerned with a novel arrangement of the elastic means generating the torque $\tau$.

For equilibrium of the pivoted beam to exist the torque must equal the gravity moment, or, I. $\qquad \tau = mgr \cos \omega$ From Figure 1 we note that $\omega = \theta + \beta$, thus Ia. $\qquad \tau = mgr \cos (\theta + \beta)$ This equation is a relation that describes the angular position ($\theta$) of the beam as a function of gravity ($g$). Any means used that is indicative of the position of the beam will naturally be attached to the framework of the instrument so that $\theta$ will be the immediately observable parameter.

Conditions to impose on the parameters of the beam to insure a detectable change in $\theta$ will result from a very small change in gravity are essential for a useful instrument.

The gravity sensitivity S can be defined as the ratio of the beam deflection ($d\theta$) to the fractional change in gravity $$\frac{dg}{g}$$

producing the deflection, or,

II. $\qquad S = \dfrac{d\theta}{dg} \text{ or } d\theta = S\dfrac{dg}{g}$

To evaluate S, Equation I is differentiated considering $\theta$ and $g$ as variable and $\tau$ as a function of $\theta$; thus, $$\frac{d\tau}{d\theta}\cdot\frac{d\theta}{dg}=\frac{mgr\cos\omega}{g}-mgr\sin\omega\frac{d\theta}{dg}$$

Rearranging the terms of the above equation, $$d\theta=\frac{mgr\cos\omega}{\frac{d\tau}{d\theta}+mgr\sin\omega}\cdot\frac{dg}{g}$$

which when compared to Equation II shows that

III. $\qquad S=\dfrac{mgr\cos\omega}{\dfrac{d\tau}{d\theta}+mgr\sin\omega}$

Equation III is very general and is applicable to any pivoted beam using any type of elastic members to support the beam. Various forms of the torque function result from the variety of available types of elastic members and methods of attachment to the beam.

For practical purposes it is necessary that a gravity meter have sufficient sensitivity S to measurably respond to gravity changes so small that $$\frac{dg}{g}$$

is of the order of $10^{-7}$. To obtain this condition S is usually of the order of 20 to 200 if high resolving power optical means are used to detect the deflections of the beam. These high values of S are readily obtained by proper selection of the parameters in Equation III. In fact, it is possible to cause the beam to be infinitely sensitive to gravity by choosing the parameters of Equation III in such a manner that the denominator becomes zero; i. e., IV. $\qquad \dfrac{d\tau}{d\theta}=-mgr\sin\omega$ Infinite sensitivity is of course impractical so that in any usable instrument S is large but not infinite. This process of securing high sensitivity by approaching the condition described by Equation IV has been described in various ways in the prior art; "labilizing," "astatization" and inducing a "long period of oscillation" are common terms that have been used.

By a further consideration of Equation I it is possible to learn how the parameters of the beam such as $\tau$, $\omega$, $r$, etc., may be chosen to minimize level sensitivity. In Figure 1 it is evident that the angle $\beta$ represents the orientation of the instrument with the true horizontal surface. Errors in levelling will appear as variations in $\beta$. Level errors in the perpendicular direction will appear as variations in the angle which the axis of rotation of the beam makes with the horizontal. This angle will be denoted as $\beta'$. In the development of all the previous equations it has been assumed that the axis of rotation was horizontal and $\beta'$ was equal to zero. To discuss level sensitivity it will be necessary to first assume the axis of rotation is slightly out of level by an amount $\beta'$ and then to determine what effect variations in $\beta'$ as well as in $\beta$ will have on the deflection of the beam.

When $\beta'$ is different from zero Equation I (a) must be modified to allow for a decrease in the gravity moment of the beam when its plane of rotation is not exactly vertical. Equation I (a) becomes Ib. $\qquad \tau=mgr\cos(\theta+\beta)\cos\beta'$ For minimum level sensitivity it is then required that $$\frac{d\theta}{d\beta} \text{ and } \frac{d\theta}{d\beta'}$$

approach a minimum value, zero if possible, thereby indicating that level errors $d\beta$ and $d\beta'$ will cause a negligible beam deflection $d\theta$.

Differentiating Equation I(b) considering $\theta$ as a function of $\beta$ $$\frac{d\theta}{d\beta}=-\frac{mgr\sin\omega\cos\beta'}{\dfrac{d\tau}{d\theta}+mgr\sin\omega\cos\beta'}$$

Since $\beta'$ is a very small angle, $\cos\beta'$ can be approximated by unity and by introducing the sensitivity S the above equation becomes V. $\qquad \dfrac{d\theta}{d\beta}=-S\tan\omega$ Considering $\theta$ as a function of $\beta'$ and again differentiating I(b)

VI. $\qquad \dfrac{d\theta}{d\beta'}=-S\sin\beta'$

Thus minimum level sensitivity is acquired by operating the beam in such a position that $\omega$ is essentially zero degrees and by maintaining the axis of rotation in a horizontal plane so that $\beta'$ is essentially zero, whereupon both $$\frac{d\theta}{d\beta} \text{ and } \frac{d\theta}{d\beta'}$$

closely approach zero. This is readily accomplished by adjusting the center of gravity of the beam into the same horizontal line (PQ) as includes the axis 0. A level vial mounted on the framework of the instrument parallel to the beam may be used as an indicator of the correct level position to assure that $\omega=0$. A second level vial perpendicular to the first mentioned vial may be used to indicate the level disposition of the axis of rotation.

Figure 2:
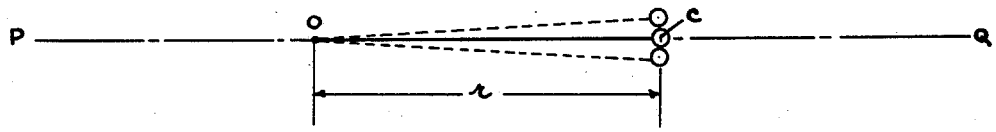
Figure 2 is a diagram illustrating the minimum level sensitivity of the instrument.
Figure 13:
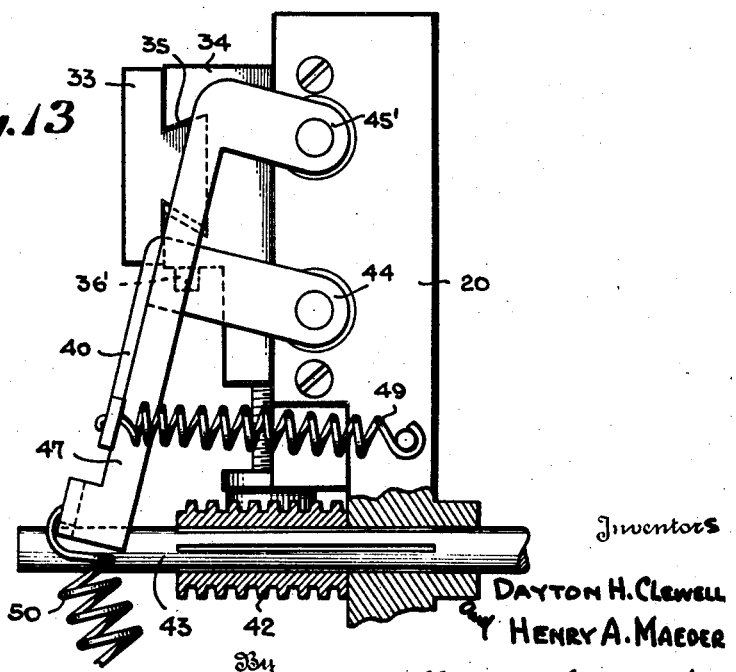
Figure 13 is a detail sectional view of the support shown in Figure 11 showing the slide rest locking means in their raised position.

A further illustration of the method of securing a minimum level sensitivity is shown in Figure 2 wherein it is obvious that so long as the beam is operating within a small angular range above and below the horizontal line PQ, the projection of $r$ (the moment arm of the mass) on the horizontal plane is relatively independent of the angular position of the beam.

It is immediately evident that the condition for low level sensitivity wherein $\omega$ is essentially zero, reduces the sensitivity equation, Equation III to IIIa. $\qquad S=\dfrac{mgr}{\dfrac{d\tau}{d\theta}}$ To attain a high sensitivity to gravity it is now only necessary that $$\frac{d\tau}{d\theta}$$

be small compared to $mgr$.

It is obvious that with a large value of the sensitivity S an appreciable gravity change will deflect the beam to such an extent that the center of gravity of the beam will depart appreciably from the horizontal line PQ and the level sensitivity will no longer have the desired minimum. Therefore, a preferable embodiment of any horizontal beam gravity meter will include a nulling means by which the beam can always be returned to its horizontal position. The small effort exerted by the nulling means in order to restore the beam to its preferred horizontal position will then be a measure of the change in gravity which caused the original deflection of the beam.

Equation IV describes a relationship between the parameters of the beam which if satisfied results in an infinitely sensitive beam; i. e., a very unstable beam. Since $\omega=\theta+\beta$ it is entirely possible that some value of $\theta$ within the narrow operating range of the beam may satisfy the conditions of Equation IV and the beam is unstable at a certain point which may be very close to its preferred horizontal position where $\omega=0$. Such a condition of instability is highly undesirable in a practical field gravity meter. Thus in the construction of a rugged usable gravity meter of this type the parameters of the beam must be still further restricted to such an extent that a high beam sensitivity can be obtained while at the same time any unstable position of the beam is as far removed as possible from the operating range of the beam.

This stability restriction can be readily satisfied by requiring the sensitivity S to be as constant as possible over the operating range of the beam, i. e., $$\gamma=\frac{dS}{d\theta} \longrightarrow 0$$

It is obvious that if S is a finite constant value for all operating positions of the beam then there will be no positions of infinite sensitivity where the beam is highly unstable. The more closely $\gamma$ approaches zero the further any points of instability will be removed from the normal operating range and the more stable the equilibrium of the beam becomes.

The new parameter $\gamma$ can be evaluated directly from Equation III considering S and $\theta$ as the variables.

$$\gamma=\frac{dS}{d\theta}=-S\tan\omega-S^2\left[1+\frac{1}{mgr\cos\omega}\cdot\frac{d^2\tau}{d\theta^2}\right]$$

In any practical instrument the conditions of minimum level sensitivity $\omega=0$ renders the first term on the right hand side of the equation zero and VII. $\qquad \gamma=-S^2\left[1+\frac{1}{mgr}\cdot\frac{d^2\tau}{d\theta^2}\right]$ From ths equation it is apparent that $\gamma$ will approach zero as $$\frac{d^2\tau}{d\theta^2}$$

approaches $(-mgr)$.

From the preceding theoretical discussion it is required that the method of attachment provide that the torque exerted by the elastic member be such a function of the angular rotation of the gravity responsive beam that $\tau$ equal $mgr$ (Equation I with $\omega=0$) so as to fully support the beam in horizontal equilibrium, that $$\frac{d\tau}{d\theta}$$

be a small quantity compared to $mgr$ (Equation IIIa) so as to provide a high sensitivity S and further that $$\frac{d^2\tau}{d\theta^2}$$

approach $(-mgr)$ (Equation VII) to insure high stability; that is, a low value of $\gamma$. Two obviously simple torque functions satisfying these three conditions are VIII. $\qquad \tau=Z\sin(\theta-\delta)$ with $(\theta-\delta)$ in the neighborhood of 90° and Z is a constant closely approximating $mgr$ (exactly equal to $mgr$ when $(\theta-\delta)$ equals 90°) or IX. $\qquad \tau=Z\cos(\theta-\delta)$ with $(\theta-\delta)$ in the neighborhood of zero degrees and again Z is a constant closely approximating $mgr$ (exactly equal to $mgr$ when $(\theta-\delta)$ equals 0°). $\delta$ is any arbitrary constant. The designer will also provide a means of adjusting the operating range of the beam within limits that are free of undue level sensitivity; that is, a null means must be provided for maintaining $\omega$ equal to zero. The necessary adjustment of the nulling means required to zero $\omega$ will thus be a measure of the changes in gravitational force.

While the above theory has been discussed in connection with Figures 1 and 2, the remaining figures for purpose of explanation illustrate detailed constructions which utilize the theory in operation.

Figure 3:
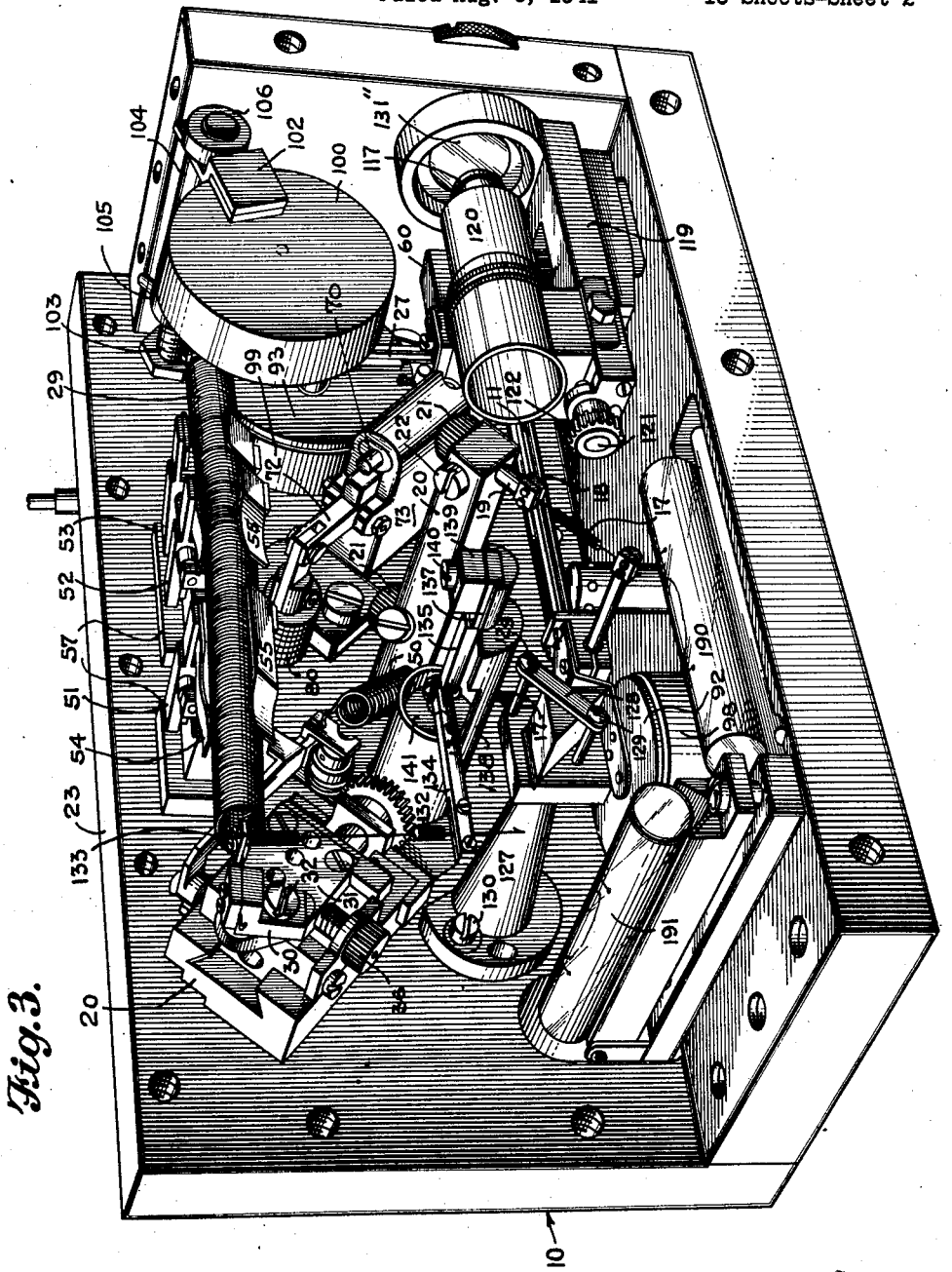
Figure 3 is a perspective view of the gravity meter showing all of the working elements in assembled relationship.
Figure 16:
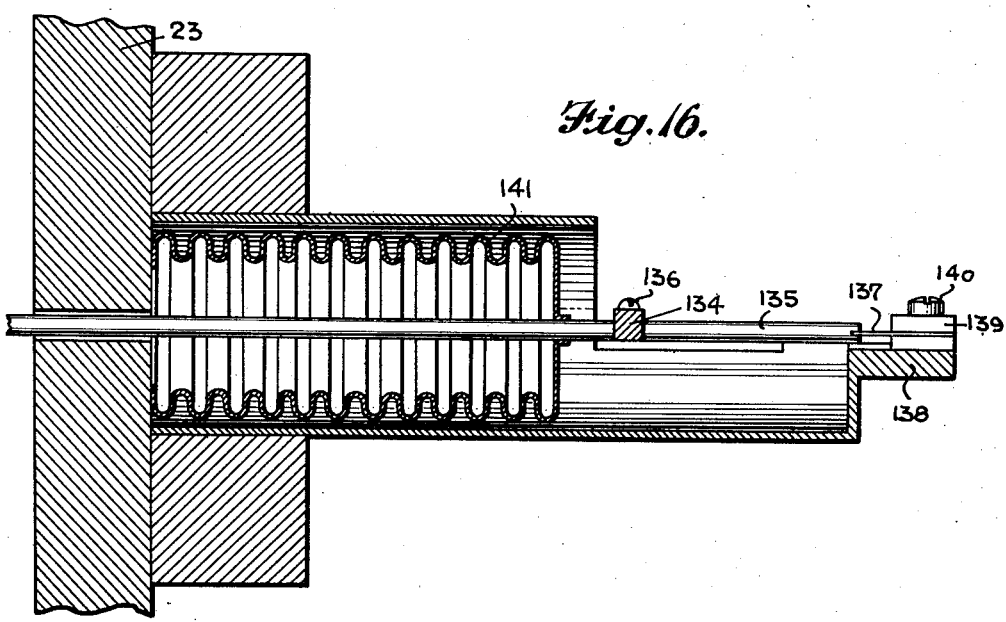
Figure 16 is a vertical sectional view of the nulling lever which passes through the housing and the support therefor.

Referring to Figure 3 for the details of construction of the gravity meter, there is shown a case 10, which encloses the elements of the gravity meter. Within the case 10 there is mounted for rotation in a vertical plane a mass 11. Mass 11, shown in detail in Figures 4 and 5 is substantially L-shaped and has most of its weight concentrated at the enlarged portion 12. The outer end of the substantially horizontal mass arm 13 is provided with a clamp 14 that is adapted to engage a transverse rod 15, which forms a part of the pivot for the mass 11. The outer ends of the rod 15 are provided with clamps 16 that are adapted to engage one end of each of two coil springs 17 (Figure 15). The opposite ends of the coil springs 17 are secured in axial alignment, by means of clamps 18, to the operating elements 19 that are rotatably and slidably mounted in the casting 20. Operating elements 19 extend through the casting and are provided at their outer end with a knurled head 21 by means of which the springs 17 can be positioned. In order to hold the operating elements in their adjusted position, screws 22 that threadedly engage the casting 20, as shown in Figure 11, are brought into contact with the body of the operating elements 19.

The casting 20 is secured to side wall 23 of the housing 10 at a single point by means of the bolt 24 as shown in Figure 28. Bolt 24 is preferably formed with its head made integral with the casting 20, in such a manner that the body thereof and its threaded end extend at right angles from the back of the casting. In order that the casting 20 will not contact the side wall 23, there is provided on the bolt 24, near the back face of the casting, an annular shoulder which rests against the inner wall of the housing 10 when the bolt is passed through the opening 25 in the side wall and serves to space the casting from the side wall. The casting 20 is held in adjusted position on the side wall 23 by means of a nut 26.

The vertical arm 27 of the mass 11 is provided at its upper end with a clamp 28 by means of which one end of a pretensioned coil spring 29 is secured thereto. The opposite end of the coil spring 29 is secured by a clamp 30 to an anchor plate 31 by means of a screw 32. Anchor plate 31 is secured to the casting 20 through the medium of two dovetail slides 33 and 34 (Figure 11).

Slides 33 and 34 are so constructed that they operate at right angles to each other. Slide 33 can be operated in the dovetail ways 35 by means of the screw 36 (Figure 12) which threadedly engages the slide 33 and is rotatably secured to the other slide 34. Element 33 can be locked in adjusted position by means of the set screws 36' which press against the gib 37.

The dovetail ways 35 are formed in the second slide 34. The slide 34 is adapted to move in dovetail ways 38 formed in the casting 20 at right angles to the direction of movement of the slide 33. Movement of the slide 34 is effected by means of the screw 39 that threadedly engages the slide 34. The outer end of the screw is rotatably secured to the casting 20 by means of the bracket 40 and is provided with a worm gear 41. Worm gear 41 can be rotated to adjust the position of slide 34 from a point without the housing by means of the worm 42 and a splined rod 43.

The slide 34 is locked in adjusted position by means of set screws 44 and 45 that are operated by means of bell cranks 46 and 47, respectively. The outer end of bell crank 46 is so formed that it rests upon the bell crank 47 and is adapted to be moved by the bell crank 47 in one direction to loosen the set screw 44. Bell crank 47 is rotated to loosen the screw 45 by means of the end of the splined rod 43 which when inserted in the worm 42, engages the turned-over portion 48 of the outer end of the bell crank 47 which partially overlies the opening formed axially in the worm 42. Bell cranks 46 and 47 are biased toward locked position by means of springs 49 and 50, respectively. When the rod 43 is passed through the opening of the worm 42 its inner end engages the turned portion 48 of the bell crank 47 in such a manner that further movement of the rod to insert it will cause the bell crank 47 and bell crank 46, carried thereby, to be raised to loosen the set screws 44 and 45. Further insertion of the rod 43 forces the inner end of the rod by the turned portion 48 of bell crank 47 and thereby locks the bell cranks in their raised position. The movement of the inner end of the rod 43 beyond the turned portion 48 of bell crank 47 removes the force being exerted on the end of the rod 43 by means of the springs 49 and 50 which would tend to throw the rod out. With the end of rod 43 extending by the turned portion 48 of the bell crank 47, the worm 42 can be turned to rotate the worm gear 41 and screw 39 to adjust the position of slide 34. When proper adjustment has been made, in order to lock the sliding element in adjusted position, it is only necessary to remove the rod 43 and the springs 49 and 50 will force the bell cranks downwardly to rotate the set screws 44 and 45 to clamp the slide 34.

By means of this novel arrangement for securing the end of the pretensioned spring 29 to the casting 20, universal adjustment of the end of the spring 29 can be made to adjust either the tension in the spring itself or to adjust the lever arm through which the elastic forces exerted by the spring act on the mass.

By providing the slide 34 with means whereby its adjustment can be effected from a point outside of the gravity meter, the position of the mass can readily be adjusted without the necessity of disassembling the gravity meter. In this manner changes in the displacement of the mass due to changes in barometric pressure or physical properties of the spring can be readily compensated.

The practicability of any gravity meter depends on how nearly constant the physical properties of its elements can be maintained. Therefore, in order to limit transverse vibrations that would be imparted to the pretensioned coil spring 29 when the instrument is moved there are provided three groups of guards 51, 52 and 53. Each group of guards is provided with three independently adjustable fingers 54, 55 and 56, respectively (Figure 10). Fingers 54, 55 and 56 are pivotally mounted on the support 57 that is carried by the side wall 23 of the gravity meter housing and are so arranged that their outer ends are biased away from the coil spring 29 by means of springs 58. The outer ends of the fingers 54, 55 and 56 are so formed that when adjusted to a position adjacent the coil spring they are spaced approximately 120° apart along the circumference of the spring. The outer end of the fingers can be moved toward the coil spring by means of set screws 59 that threadedly engage the support 57. Fingers 54, 55 and 56 do not normally contact the spring 29 but are so adjusted that they will limit any transverse vibrations of the spring.

Additionally, in order to guard against changing the physical properties of the spring 29 due to shocks imparted to the instrument during transportation, there is provided clamping means for the mass that will rigidly hold the mass during transportation. Referring to Figure 7 the clamping means comprise a fixed member 60 that is secured to the side wall 23 of the gravity meter housing and which is provided with a face 61 that is parallel to a face 62 on the enlarged portion 12 of the mass 11. Points 63 project from face 61 of the fixed element 60 and are adapted to engage glass inserts 64 in the face 62 of the mass (Figure 4). Points 63 are formed on the end of set screws 65 that threadedly engage the fixed support 60 and extend completely through it to project from the face 61 thereof. In order to adjust the points 63 relative to the faces 61 and 62 it is only necessary to rotate the set screws 65 to move them in or out.

There is formed on the enlarged portion 12 of the mass a second face 66 that is parallel to the face 62 against which a plunger 67 rests to force the enlarged portion 12 of the mass downwardly against the points 63 to clamp it. As shown in Figures 6 and 7, the plunger 67 is in the form of a piston which moves in the cylinder 68. Plunger 67 is biased toward the downward position by means of the coil spring 69. The plunger 67 is provided with a rod 70 which extends through an opening 71 to a point outside the cylinder. The outer end of the rod 70 is pivotally secured to one end of a bell crank 72. Both the cylinder 68 and the bell crank 72 are carried by the support 73 that is secured to side wall 23 of the housing. Bell crank 72 is pivotally mounted on the support 73 by means of bolt 74. The other end of the bell crank 72 is pivotally secured to a link 75 by means of the bolt 74'. The other end of link 75 is pivotally connected to a cap 76. Cap 76 (Figure 29) is secured by an airtight seal to the inner end of a metallic bellows 80 that extends through the side wall 23 of the gravity meter housing. The outer end of the bellows is sealed to a flange bushing 79 which is in turn mounted on the side wall 23. A threaded axial hole 78 in flange bushing 79 receives a screw 77 (Figure 17) disposed within the metallic bellows. The free end of screw 77 is rotatably secured to cap 76 so that a rotation of the screw will cause compression or expansion of the bellows 80, operate the bell crank 72 and thence the clamp plunger 67 to clamp or unclamp mass 11. The purpose of the bellows is to permit control of the clamp from without the housing and at the same time permit the housing to be airtight.

Due to the increased contact area occasioned by the pins 63, there is always the possibility of the mass sticking to these pins when it is unclamped. Therefore, in order to positively free the mass from the three pins 63, there is provided means actuated by the plunger 67 of the mass clamp for lifting the mass when it is being unclamped. In plunger 67 as shown in Figures 6 and 7 there is provided near the outer end thereof an annular groove 84 into which the point 85 of a screw 86 projects. Screw 86 is threaded through an opening that is provided in the end of the sheet metal strap 87 which is secured to the mass by means of a screw 88. The opening 89 through which the screw 88 passes is elongated so that the position of the point 85 of the screw 86 may be adjusted relative to the of the annular groove 84 formed on the end of the plunger 67. After the depth of the point 85 has been adjusted relative to the groove 84, the screw 86 is locked by means of a nut 90. The depth of the point 85 is so adjusted relative to the groove 84 that while the mass is unclamped, the point 85 will not contact the side walls of the groove 84 thereby permitting the mass to swing freely. An elongated opening 91 is provided in the cylinder 68 in which the screw 86 carried by the mass can move without coming in contact with the cylinder 68.

When the instrument is on location and the mass 11 has been unclamped, it is desirable that its oscillations be damped so that it will come to rest immediately. To this end there are provided multi-directional damping means comprising the cup-shaped elements 92, 93 and 94. Cup-shaped element 92 is secured to the pivoted end of the mass 11 by means of a strap 95 that is secured at one end of the cup by means of the screws 96 and at the other end to the mass by means of screws 97. The plane of cup 92 is substantially horizontal and when nested with an annularly grooved element 98 (Figure 14) will damp oscillations of the mass in the vertical plane. Element 98 is provided with an annular groove that is adapted to receive the open end of the cup-shaped member, there being sufficient clearance provided that the cup-shaped member 92 will not contact the element 98 but will merely form air passageways which will serve to permit the air entrapped within the cup-shaped member to escape. Oscillations of the mass structure will cause a flow of air through these passageways and the viscous resistance of the air to this flow will absorb the oscillation energy of the mass.

Cup-shaped elements 93 and 94, secured to opposite sides of the vertical portion 27 of the mass 11, when nested with elements 99 and 100, respectively, afford lateral damping for the mass. Annularly grooved elements 99 and 100 are similar to element 98 and have secured to their backs metal straps 101 and 102 (Figure 8) that are provided with bifurcated outer ends that are adapted to straddle a bolt 103. Bolt 103 is secured to the side wall 23 of the gravity meter housing. There is threaded over the bolt a spacer sleeve 104 by means of which the distance between the cups 99 and 100 is maintained constant. The bifurcated ends of the straps 101 and 102 are locked against the ends of the spacer sleeve 104 by means of nuts 105 and 106. By loosening one of the nuts and tightening the other, lateral adjustment of the position of the cups 99 and 100 can be effected.

In order to shift the center of mass of the entire mass 11, a rod 107 is secured to the bottom of the enlarged portion 12 of the mass 11 by screws 108 and extends vertically downward therefrom (Figure 5). Adjustably mounted on the rod 107 is a link 109 which is secured thereto by a screw 110'. Link 109 extends horizontally from rod 107 in line with the horizontal portion 13 of the mass 11. The outer end of link 109 has a clamp 110 which engages a transverse rod 111. Rod 111 is locked in the clamp 110 by means of a screw 112. Pivotally secured to the ends of rod 111 are discs 113 and 114. Discs 113 and 114 are eccentrically mounted on the ends of the rod 111 so that by rotating one or both of the discs about their pivotal axes, the center of mass can be shifted in any direction in the vertical plane. Then by loosening the clamping screw 112 the center of mass can be shifted laterally by longitudinally moving the rod 111.

In order to observe the displacement of the mass (Figures 3 and 14) there is provided a scale 115 that is marked on a glass plate 116. Glass plate 116 is mounted in a frame 117 that is secured to the enlarged portion 12 of the mass 11 by means of screws 118. Horizontally disposed adjacent the scale 115 but mounted on a support 119 is a microscope objective 120 which can be focused on the scale 115 by means of the focusing screw 121. Focusing screw 121 is provided at its outer end with a worm gear 122. Worm gear 122 is driven by a worm 123 mounted on the end of a rod 124 which extends to a point outside of the gravity meter housing 10. Light entering the housing 10 of the gravity meter from a source outside the housing, passes through the glass plate 116, the microscope objective 120, and strikes the face 125 of the prism 126. Prism 126 is mounted on a support 127 by means of the link 128 and the screws 129. Support 127 is secured to the side wall 23 of the gravity meter housing by means of screws 130. Light striking the face 125 of the prism 126 is reflected upwardly and passes through the hollow tube 131 mounted in the top of the housing 10.

At the lower end of the tube 131 is mounted a glass plate 131' inscribed with a scale. The objective 120 is so adjusted that an image of one of the scale lines 115 is imaged upon the scale plate 131'. The position of this image on the scale plate 131' is indicative of the position of the mass. To further facilitate observation of the scale plate 131' a viewing microscope to be described later is trained down the hollow tube 131 on to the scale plate 131'. To properly illuminate the scale 115 on mass 11 a condenser lens 131'' is mounted in housing 10 adjacent the scale 115 but on the opposite side from the objective 120.

It is desirable that scale plate 131' be mounted to the housing 10 rather than to the viewing microscope on the outside of the gravity meter case in order to maintain scale plate 131' rigidly disposed relative to the mass 11.

In order to avoid errors that might be introduced by the mass being disposed at a different position when different measurements are taken or the parts of the meter being differently disposed about the pivot, an arrangement has been provided whereby all measurements of gravity will be taken with the mass in exactly the same position, that is to say, means are provided for nulling the instrument by measuring the force necessary to bring the gravity meter mass back to zero position after displacement due to change in gravitational force. Therefore, as shown in Figure 3, a light spring 132 shown in two sections, is secured to the coil spring 29 by means of a clamp 133 at a point adjacent the anchored end thereof. The other end of spring 132 is clamped to one end of a bar 134. The other end of bar 134 is rigidly secured to a lever 135 by means of screw 136. Lever 135 is hinged by a leaf spring 137 on the support 138 by means of the clamp 139 and screw 140. The spring 132 is made in two sections to insure that the displacement of the end of the pretensioned coil spring 29 is a linear function of the angular displacement of lever 135. Linearity is possible only if spring 132 functions as a perfectly flexible stretchable fiber. By placing both end coils of the spring adjacent the points of attachment of the spring the flexibility of a fiber is simulated. The other end of lever 135 extends through a metal bellows 141 to a point outside of the side wall 23 of the housing 10 (Figures 17 and 18). The outer end of lever 135 is hinged on another lever 142 that is entirely outside of the gravity meter housing 10 at a point intermediate the ends thereof by means of a leaf spring 143 that is provided with a twist to permit flexure in two directions. One end of lever 142 is pivotally mounted on the housing 10 of the gravity meter by means of a leaf spring 144, clamp 145 and screws 146. The opposite end of lever 142 is pivotally secured to the sliding element 147 of a dovetail slide 148 by means of a leaf spring 149 (shown in Figure 18, but omitted in Figure 17 for clarity). The sliding element 147 of the dovetail slide 148 is adapted to move in the vertical dovetail ways 150 by rotating the screw 151. In order to eliminate any backlash in the slide there is provided a spring 152 which biases the sliding member 147 downwardly against the threads of the screw 151. Spring 152 is anchored to the front wall of the housing 10 by means of screw 153. In order to adjust the slide 148 from a remote point, there is provided a rod 154 that is secured to the adjusting screw 151.

With the system of levers described above, it is possible to highly magnify and measure the displacement of the end of the coil spring 29 necessary to move the mass until the scale is brought back to a zero reading. Displacing the end of coil spring 29 effects a change in the lever arm through which the elastic force exerted by the spring 29 acts on the mass 11.

Figure 24:
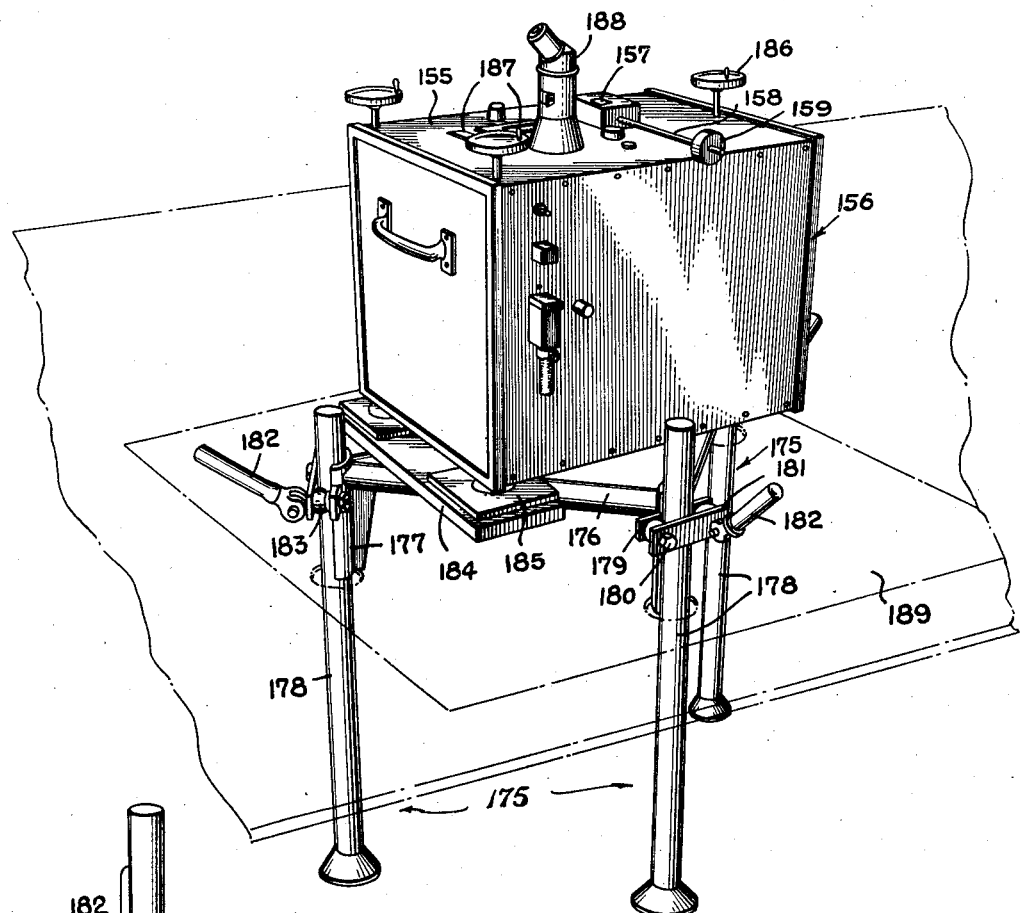
Figure 24 is a perspective view of the completely assembled gravity meter mounted in operative position on a tripod.

As shown in Figure 24 in order to measure the amount of force exerted in displacing the end of spring 29 enough to null the instrument, there is provided on the top 155 of the outer gravity meter casing 156 a conventional scale 157 which may be calibrated in units of gravity. Scale 157 is preferably formed on the periphery of a drum mounted on the shaft 158. Shaft 158 extends through the scale 157 and is connected to rod 154 that adjusts the slide 148 by means of gears. The other end of rod 158 is provided with an operating handle or crank 159 by means of which the rod 158 is rotated to effect a nulling of the instrument.

The inner casing 10 of the gravity meter is preferably formed of heavy gauge aluminum and serves as an element of high heat capacity.

Figure 20:
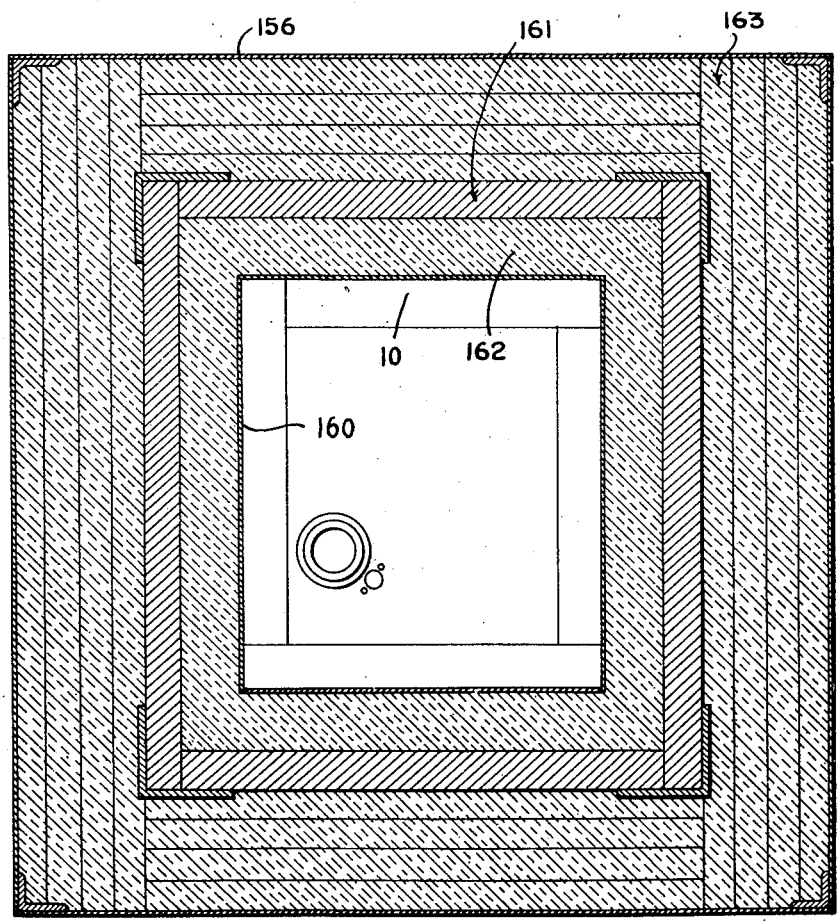
Figure 20 is a vertical cross section of the oven showing the inner casing, its magnetic shield, a layer of insulation surrounded by the heating oven, another layer of insulation and the outer casing.

In order to magnetically shield the working elements of the gravity meter, the casing 10 is placed inside of an iron envelope 160 (Figure 20) which is provided with apertures for the optical system and for the operating shafts.

The gravity meter then, within the magnetic shield, is placed within an oven 161. The space between the magnetic shield 160 and the oven 161 is filled with a heat attenuating material 162 such as felt. In the normal method of controlling the temperature of the oven by the use of thermoregulators the temperature of the oven is not exactly constant but varies cyclically within a narrow temperature range, because of the cyclic application of heat to the oven. To prevent these cyclic temperature variations from reaching the instrument the attenuating material 162 is necessary. An attenuating material differs from a hot and cold insulating material in that the former must have a high specific heat as well as a low thermal conductivity. Oven 161 is placed within the outer casing 156 but spaced from the walls and ends thereof by means of heavy layers of hot and cold insulation 163.

The oven 161 and its enclosed gravity meter are maintained at a substantially constant temperature by means of heating coils 164. Heating coils 164 are imbedded in the outer surface of the oven walls and are arranged as shown in Figure 21. Heating coils 164 comprise two main coils 165 and 166 each of which is divided into three sections. Heating coil 165, comprising sections 167, 168 and 169, heats one end, the top and one side, while heating coil 166, being divided into sections 170, 171 and 172, heats the bottom, the other end and the other side. By distributing the heating coils in this manner a more even distribution of heat can be made.

In the event of extreme cold weather an auxiliary heating coil 166' is distributed uniformly over the six sides of the oven in such a manner that the windings are everywhere adjacent the windings of coils 165 and 166. Coil 166' is represented by the dotted line in Figure 21.

As shown in Figure 22, the currents supplied to the heating coils 165 and 166 by means of a storage battery B are controlled by thermal regulators 173 and 174, respectively, and the relays R1 and R2, respectively. By placing the thermal regulators at the diametrically opposite corners of the oven that are formed by the juncture of the three sides controlled by each winding (as shown in Figure 23) an accurate control of the temperature can be obtained. By closing switch S in Figure 22 the auxiliary heating coil 166' is placed under the control of thermoregulator 176.

As shown in Figure 24 the complete assembled unit in its insulating oven is mounted on a tripod 175. The tripod 175 comprises a triangle 176 formed of tubing which has secured to the vertices thereof, by welding, bearings 177 in which legs 178 are adapted to be clamped. Legs 178 may also be formed of tubing. Bearings 177 are provided at each side with outwardly extending ears 179 through which bolts 180 pass to hold the straps 181 in clamping position against the legs. One of the bolts 180 in each clamp, instead of being provided with the conventional head, is in the form of an eye-bolt and has pivotally mounted in the eye thereof, an operating cam 182. After the conventional bolts 180 have been adjusted then the cam 182 is forced down about its pivotal axis thereby forcing the strap 181 firmly against the leg 178 to hold it in its bearing 177. There are threaded over the bolts 180 and disposed between the respective ends of the straps 181 and the ears 179, sections of rubber hose 183 which serve to force the strap 181 away from the leg when the handle of the cam is pulled upward to release the leg.

To form a bed on which the gravity meter housing can rest, there are secured to the triangle, supports 184 that are provided with rubber cushions 185 which serve to cushion the gravity meter against shock when it is placed on the tripod. The rubber cushions 185 have a circular portion cut out of the center of each so that the levelling screws 186 when lowered to level the instrument will come in direct contact with the support 184.

Figure 25:
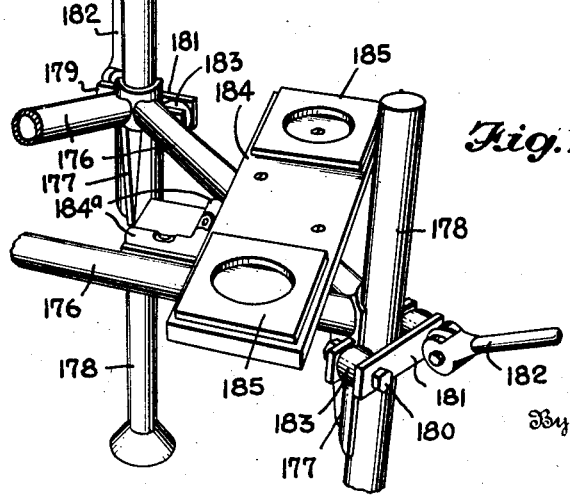
Figure 25 is an enlarged fragmentary perspective view of the tripod showing the details of construction of the leg clamps.

As shown in Figure 25 the tripod is provided with a pair of level vials 184a by means of which the gravity meter support can be leveled.

The viewing microscope 188 disposed adjacent the level viewing windows 187 on the top 155 of the gravity meter housing 156 is optically connected with the optical system described above and is used to observe the scale plate 131'.

The gravity meter as shown in Figure 24, set up in operative position, if desired, may be carried in the body of a vehicle. The legs 178 of the tripod are shown extending downwardly through openings in the floor 189 of a vehicle, a fragment of which is shown in dotted lines.

As shown in Figure 3 there are level vials 190 and 191 disposed within the inner gravity meter case 10. These level vials are to aid in levelling the inner case 10 when it is placed within the oven 161. Oven 161 in turn is provided with a pair of level vials 192 and 193 by means of which the oven in turn is levelled relative to the true vertical. These levels are visible through windows 187 on the top 155.

Figures 26, 27:
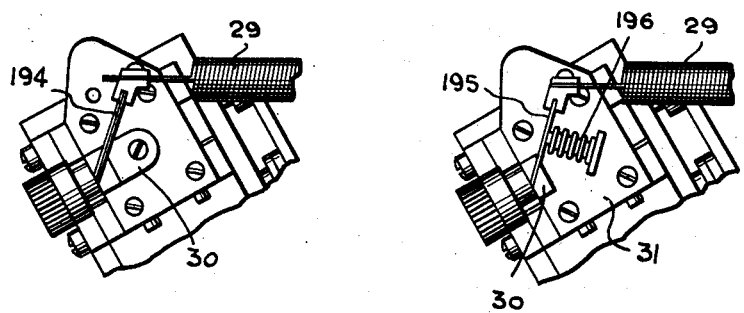
Figure 26 is a modification of the instant invention in that it shows bi-metal means for compensating for changes in temperature within the gravity meter.
Figure 27 is another modification of the instant invention in that it shows a bellows filled with a temperature responsive fluid interposed between the end of the pretensioned coil spring and its anchor for compensating for changes in temperature.

In Figure 26 there is shown a modification of the instant invention. In this form of the device there is provided a bimetal element 194 disposed between the end of the pretensioned coil spring 29 and its anchor clamp 30. The bimetal element is so arranged that changes in temperature which would cause the pretensioned coil spring 29 to contract or expand would be compensated by the warping of the bimetal member. By using a bimetal element of this character the tension exerted on the pretensioned coil spring which controls the sensitivity of the instrument is maintained constant for all temperatures.

In Figure 27 there is shown still another modification of the gravity meter differing from that disclosed in Figure 26 in that there is disposed between the end of the pretensioned coil spring 29 and its anchor clamp 30 a leaf spring 195. A metal bellows 196 having a temperature responsive fluid sealed therein is secured to the leaf spring 195 at a point adjacent its juncture with the end of the pretensioned coil spring 29. The other end of the metal bellows is secured to the spring anchor 31. Changes of temperature will cause an expansion or contraction of the fluid sealed within the bellows which in turn will cause the bellows to expand or contract to flex the leaf spring 195 to change the tension in the pretensioned coil spring.

In operation the tripod is set up at the location where it is desired to make a reading, levelled and the legs clamped. Then the gravity meter, having its levelling screws retracted, is placed on the supports carried by the tripod and levelled by means of the level screws 186. After the instrument has been accurately levelled, the mass is unclamped and allowed to swing freely. Then after the mass has come to rest an observation of the displacement thereof due to the action of gravitational force on the mass is made by means of the viewing microscope 188 and its associated optical system. The instrument is then nulled by operating the handle or crank 159 to displace the end of the pretensioned coil spring 29 enough to change the lever arm through which it exerts an elastic force on the mass sufficient to return the mass to its zero position. The mass is then again clamped and the instrument is ready to be moved to the new location

We claim:

1. A force measuring device comprising in combination, a housing, a support within said housing secured thereto, a mass, means for pivotally securing the mass to the support for rotation in a vertical plane, means secured to the mass for elastically balancing the effect of gravitational forces on said mass, means for securing said elastically balancing means to the support, said means comprising a pair of slides, common means for adjusting one of said slides and locking it in adjusted position, and means for observing the position of the mass relative to the housing and support, whereby changes in the position of the mass due to the action of gravitational force thereon can be measured.

2. A force measuring device comprising in combination, a housing, a support within said housing secured thereto, a mass, means for pivotally securing the mass to the support for rotation in a vertical plane, means for elastically balancing the effect of gravitational forces on said mass secured to the mass, means for securing the other end of said elastic means to the support, said means comprising a pair of slides interposed between the end of the elastic means and the support, separate means for relatively adjusting the slides at right angles to each other to displace the end of the elastic means in a direction that is in the plane of rotation of the mass one of said adjusting means also serving to lock one of said slides in adjusted position, and means for observing the position of the mass relative to the housing and support, whereby changes in the position of the mass due to the action of gravitational force thereon can be measured.

3. An instrument for measuring gravitational force comprising in combination, a mass, a support for said mass, means for pivotally mounting said mass on said support for rotation in a vertical plane, means for elastically resisting the rotation of said mass, means for anchoring said elastic means on said support, means for universally adjusting said anchoring means in the plane of rotation of the mass, said means comprising a pair of slides interposed between said elastic means and said support, separate means for independently moving said slides at right angles to each other, means for locking one of the slides, and common means for actuating the means for moving the last mentioned slide and for actuating the locking means, and means for indicating the rotational position of said mass.

4. An instrument for measuring gravitational force comprising in combination, a mass, a support for said mass, means for pivotally mounting said mass on said support for rotation in a vertical plane, means for elastically resisting the rotation of said mass, and means for indicating the rotational position of said mass, means for clamping said mass when said instrument is being moved from one location to another, said means comprising a fixed member adapted to engage the mass, a plunger adapted to force the mass against said fixed member and clamp it thereagainst, and means carried by said mass and operable by said plunger for positively disengaging said mass from said fixed member upon release of said clamping means.

5. An instrument for measuring gravitational force comprising in combination, a mass, a support for said mass, means for pivotally mounting said mass on said support for rotation in a vertical plane, means for elastically resisting the rotation of said mass, and means for indicating the rotational position of said mass, means for clamping said mass when said instrument is being moved from one location to another, said means comprising a fixed member adapted to engage the mass, a plunger adapted to force the mass against said fixed member and clamp it thereagainst, and a pin carried by said mass in such a manner that the end thereof will be contacted by the plunger when the mass is unclamped to positively dislodge the mass from the fixed element.

6. An instrument for measuring gravitational force comprising in combination, a mass, a support for said mass, means for pivotally mounting said mass on said support for rotation in a vertical plane, means for elastically resisting the rotation of said mass, means for indicating the rotational position of said mass, and means for damping the movements of said mass in all directions, said means comprising a plurality of pistons carried by said mass and a corresponding number of cylinders fixed to said support adapted to receive but not contact said pistons.

7. An instrument for measuring gravitational force comprising in combination, a mass, a support for said mass, means for pivotally mounting said mass on said support for rotation in a vertical plane, means for elastically resisting the rotation of said mass, means for indicating the rotational positon of said mass, and means for damping the movements of said mass in all directions, said means comprising a plurality of cylindrical cup-shaped pistons carried by said mass and a corresponding number of annularly grooved elements fixed to said support adapted to receive but not contact said cylindrical cup-shaped pistons.

8. A force measuring device comprising in combination a housing, a support within said housing secured thereto, a mass, means for pivotally securing the mass to the support for rotation in a vertical plane, elastic means attached to the support and to the mass for balancing the effect of gravitational forces on said mass, means to adjust the point of attachment of the elastic means to the support comprising a pair of slides interposed between the end of the elastic means and the support, common means for adjusting one slide to displace the end of the elastic means in a direction that is in the plane of rotation of the mass to vary the lever arm through which the elastic means acts on the mass and for locking said slide in the adjusted position, and means for observing the position of the mass relative to the housing and support, whereby changes in the position of the mass due to the action of gravitational force thereon can be measured.

9. An instrument for measuring gravitational force comprising in combination, a mass, a support for said mass, means for pivotally mounting said mass on said support for rotation in a vertical plane, means for elastically resisting the rotation of said mass, and means for indicating the rotational position of said mass, means for clamping said mass when said instrument is being moved from one location to another, said means comprising a fixed member adapted to engage the mass, means for forcing the mass against said fixed member to clamp it thereagainst, and means operable by said forcing means for positively disengaging said mass from said fixed member upon release of said clamping means.

10. An instrument for measuring gravitational force comprising in combination, a housing, a mass disposed in said housing, a support for said mass within said housing, means for pivotally mounting said mass on said support for rotation in a vertical plane, means for elastically resisting the rotation of said mass, means for indicating the rotational position of said mass, and means carried by said mass cooperating with means carried by said housing for damping the movements of said mass in all directions.

11. In an instrument for measuring gravitational force a housing, a mass disposed within said housing, a support for said mass, means for pivotally mounting said mass on said support for rotation in a vertical plane, means for elastically resisting the rotation of said mass, means for anchoring said elastic means on said support, means for indicating the rotational position of said mass, an oven for enclosing said housing, and heating means for said oven, the improvement that comprises providing said heating means with two independent heating coils, one coil uniformly distributed over each half of the oven, and two independent means to control the heat generated by each coil, each of said means located in the same half of the oven as the coil which it controls in order to maintain a constant temperature distribution throughout said oven.

12. In an instrument for measuring gravitational force having a housing, a mass disposed within said housing, a support for said mass, means for pivotally mounting said mass on said support for rotation in a vertical plane, means for elastically resisting the rotation of said mass, means for anchoring said elastic means on said support, means for universally adjusting said anchoring means in the plane of rotation of the mass, means for indicating the rotational position of said mass, an oven for enclosing said housing, and heating means for said oven, said heating means comprising two independent heating coils, one coil uniformly distributed over each half of the oven, an auxiliary heating coil uniformly distributed over the entire oven surface as supplemental heating means in cold weather, and two independent means for controlling the heat generated by each coil, one of said means for controlling the heat generated by one of the independent coils which heats one-half of the oven and the other means controlling the heat generated by the other independent coil and the auxiliary coil.

13. A force measuring device comprising in combination, a housing, a support within said housing and secured thereto, a mass, means for pivotally mounting the mass on the support for rotation in a vertical plane, means for observing movement of the mass, elastic means attached to the support and to the mass for balancing the effect of gravitational forces acting on the mass and means to adjust the point of attachment of the elastic means to the support to any desired point in a limited region of the plane of rotation of the mass comprising a pair of slides adapted to move at right angles to one another, one of said slides moving said point of attachment along a line through the axis of rotation, and common means for adjusting one of said slides and locking it in adjusted position.

14. A force measuring device comprising in combination, a housing, a support within said housing and secured thereto, a mass, means for pivotally mounting the mass on the support for rotation in a vertical plane, means for observing movement of the mass, elastic means attached to the support and to the mass for balancing the effect of gravitational forces acting on the mass and means to adjust the point of attachment of the elastic means to the support to any desired point in a limited region of the plane of rotation of the mass, means for adjusting the center of gravity of the mass comprising a rod slidably connected to the mass in substantial parallel alignment with the axis of rotation of the mass, two eccentric disks rotatably connected to opposite ends of the rod and free to be rotated independently of one another whereby the center of gravity of the mass can be shifted in any or all of three mutually perpendicular directions.

15. A force measuring device comprising in combination, a housing, a support within said housing, and secured thereto, a mass, means for pivotally mounting the mass on the support for rotation in a vertical plane, means for observing movement of the mass, elastic means attached to the support and to the mass for balancing the effect of gravitational forces acting on the mass and means to adjust the point of attachment of the elastic means to the support to any desired point in a limited region of the plane of rotation of the mass, and means carried by the mass for shifting the center of gravity of the mass in any or all of three mutually perpendicular directions.

16. A force measuring device comprising in combination, a housing, a support within said housing, and secured thereto, a mass, means for pivotally mounting the mass to the support for rotation in a vertical plane, means for observing movement of the mass, elastic means attached to the support and to the mass for balancing the effect of gravitational forces acting on the mass and means to adjust the point of attachment of the elastic means to the support to any desired point in a limited region of the plane of rotation of the mass, and means for universally adjusting the center of gravity of the mass, said means comprising independent means for shifting the center of gravity of the mass in three mutually perpendicular directions.

17. In an instrument for measuring gravitational forces a housing, a mass disposed within said housing, a support for said mass, means for pivotally mounting said mass on said support for rotation in a vertical plane, means for elastically resisting the rotation of said mass, means for anchoring said elastic means on said support, means for indicating the rotational position of said mass, an oven for enclosing said housing, and heating means for said oven, the improvement that comprises providing said heating means with two independent heating coils, one coil uniformly distributed over each half of the oven, two independent means to control the heat generated by each coil, each of said independent control means located in the same half of the oven as the coil which it controls in order to maintain a constant temperature distribution throughout said oven, and an auxiliary heating coil uniformly distributed over the entire oven space as a supplemental heating means in cool weather.

DAYTON H. CLEWELL.
HENRY A. MAEDER.